July 8, 1930.   J. B. TAYLOR   1,770,020
MEANS FOR SEPARATING DUST FROM MOIST GASES
Filed Aug. 20, 1926
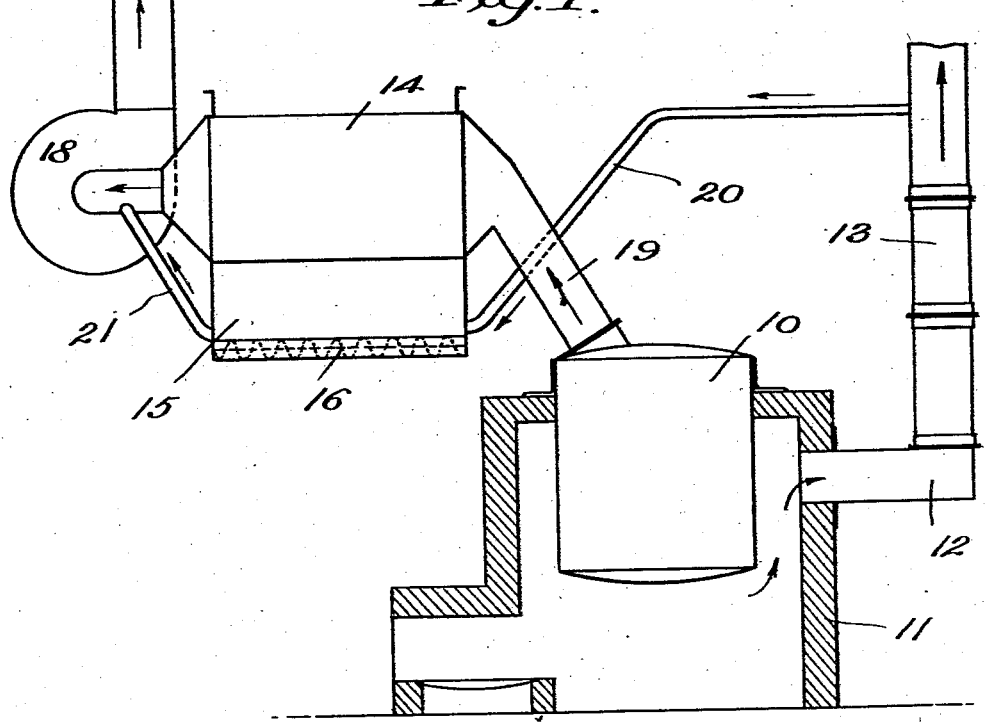
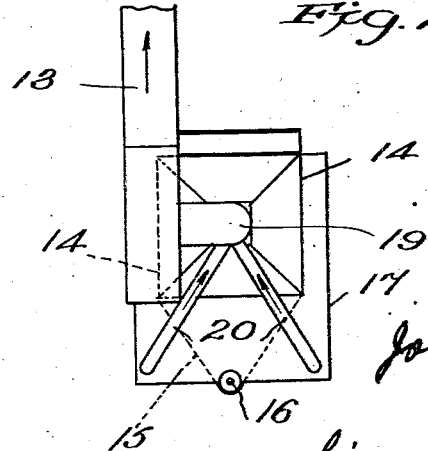
Joseph B. Taylor
Inventor
By his Attorney Patented July 8, 1930

1,770,020

UNITED STATES PATENT OFFICE

JOSEPH B. TAYLOR, OF ALLENDALE, NEW JERSEY

MEANS FOR SEPARATING DUST FROM MOIST GASES

Application filed August 20, 1926. Serial No. 130,480.

The present invention relates to a means for separating finely divided solid matter from an aeriform current containing more or less steam or vapor.

Various manufacturing processes are known in which more or less valuable material is carried away in a finely divided condition together with steam or vapor by which it is entrained and there has hitherto been devised no completely successful method for recovering this dust from the entraining stream.

Where a dust and vapor carrying stream of this character is passed through a dust collector intended for separating dust from dry air or gas, there is such a condensation of moisture within the apparatus as to interfere with its successful operation, causing a deposit of liquid in the dust collecting member and in the conveyor usually employed to remove the collected dust.

My invention, broadly speaking, comprises the utilization of sufficient heat applied to the parts of the dust collector to keep the temperature always well above the dew point. In this manner I have found that the working conditions within the apparatus are such that separation of the entrained dust is entirely successful.

One of the various instances in which my invention is useful is in connection with apparatus for removing the water of crystallization from gypsum, and I have explained the invention hereinafter in connection with this particular apparatus, although it is to be understood that my invention is not limited to this specific application thereof.

My invention is illustrated in the above named connection in the accompanying drawing wherein Figure 1 is a diagrammatic view partly in elevation and partly in section showing preferred structure and Figure 2 is a diagrammatic end elevation of the upper part of the same.

At 10 is represented the kettle in which the gypsum is to be heated to drive off its water of crystallization, the walls of the furnace used for this purpose being shown diagrammatically at 11.

At 12 is shown the flue leading to the stack 13, by which the furnace gases are led away.

A dust collector of any desired form (for instance that, set forth in my Patent #1,527,235 dated February 24, 1925) is indicated at 14, the same having a dust receiving member 15, from which the dust is taken out by a screw conveyor 16 or the like.

A jacketing casing 17 is constructed around the conveyor, and preferably around the dust receiving bin or member 15 as well, in such a manner as to leave a material space between such casing and the walls of the apparatus surrounded thereby.

At 18 is shown the blower or fan by means of which the moist gases from the kettle 10 are drawn through the conduit 19 and the collector, as indicated by the arrows.

In order to carry out my improved process, I supply a current of air or gas, passing through the jacketing space, such air or gas having a temperature sufficient to prevent condensation of moisture within the collector. The preferred construction for this purpose is shown in the drawing and comprises a pipe 20 leading from the stack or flue of the furnace 11 to the jacketing space, and a similar pipe 21, leading from the jacketing space to the fan 18. I preferably form the pipe 20 with two branches, as shown, leading to the two sides of the lower part of the jacketing member. The particular arrangement of the pipes 20 and 21 is not material.

In the specific type of apparatus herein shown by way of example, the vapor-bearing stream passing through the conduit 19 would have a temperature of somewhere about 250 degrees Fahrenheit. Such a stream, meeting the relatively cold parts within the dust collector, would condense, and a thick moist mud would fall into the bin 15.

The gases drawn by the fan 18 through the pipes 20, the jacket 17 and the pipe 21 leave the stack 13 at a much higher temperature—say five or six hundred degrees Fahrenheit. In consequence all the parts of the conveyor proper are kept so hot that the moisture drawn from the kettle 10 is not allowed to condense at any point, and successful separation of the entrained solid matter becomes entirely feasible. The hot gases also prevent condensation within the fan 18.

My process can be carried out by a great variety of apparatus, and many modifications can be made in the apparatus shown without departing from the scope of my invention, which is not limited to the details herein shown and described.

What I claim is—

A dust separator, and a current-producing device adapted to draw a gaseous stream therethrough, a jacketing means around the separator, and means for conveying hot gases through the jacket and the current-producing device.

In testimony whereof I have hereto affixed my signature on this 13th day of August 1926.

JOSEPH B. TAYLOR.